(12) United States Patent
Nawabi et al.

(10) Patent No.: US 11,022,188 B2
(45) Date of Patent: Jun. 1, 2021

(54) OVERLOAD CLUTCH

(71) Applicants: Precision Motors Deutsche Minebea GmbH, Villingen-Schwenningen (DE); Tesla, Inc., Palo Alto, CA (US)

(72) Inventors: Sasan Nawabi, Palo Alto, CA (US); Jan Egberink, Schwanheim (DE)

(73) Assignees: MINEBEAMITSUMI TECHNOLOGY CENTER EUROPE GMBH, Villingen-Schwenningen (DE); TESLA, INC., Palo Alto, CA (US)

( * ) Notice: Subject to any disclaimer, the term of this patent is extended or adjusted under 35 U.S.C. 154(b) by 56 days.

(21) Appl. No.: 16/402,529

(22) Filed: May 3, 2019

(65) Prior Publication Data
US 2020/0347894 A1   Nov. 5, 2020

(51) Int. Cl.
*F16D 43/202* (2006.01)
*F16D 1/08* (2006.01)
*H02P 9/10* (2006.01)

(52) U.S. Cl.
CPC ....... *F16D 43/2026* (2013.01); *F16D 1/0823* (2013.01); *H02P 9/10* (2013.01)

(58) Field of Classification Search
CPC ........... F16D 43/202–208; F16D 7/044; F16D 43/2026; F16D 43/2024; F16D 1/112; F16D 2300/00; F16D 2300/26; F16D 2250/0061; F16D 2250/0084
See application file for complete search history.

(56) References Cited

U.S. PATENT DOCUMENTS

| | | | |
|---|---|---|---|
| 4,980,591 A * | 12/1990 | Takanashi | F16D 43/2024 192/223.1 |
| 9,102,396 B2 * | 8/2015 | Curren | B64C 11/04 |
| 2007/0029143 A1 * | 2/2007 | Adachi | F16D 65/0025 188/72.8 |
| 2016/0201741 A1 * | 7/2016 | Hong | F16D 43/2026 192/46 |
| 2016/0230820 A1 * | 8/2016 | Matthews | F16D 43/2024 |
| 2018/0023669 A1 * | 1/2018 | Guttenberger | F16H 57/082 475/337 |
| 2018/0119755 A1 * | 5/2018 | Sato | H02K 7/108 |

* cited by examiner

*Primary Examiner* — Ernesto A Suarez
*Assistant Examiner* — Lillian T Nguyen

(57) ABSTRACT

The disclosure relates to an overload clutch, comprising a cylindrical clutch housing having a housing body and a housing cover, and comprising two clutch elements arranged within the clutch housing, via which a drive movement is transmissible in an engaged state, wherein the clutch elements, for transmitting the drive movement in the engaged state, are engaged with each other in an interlocking and/or frictional manner and, can be brought out of engagement when an overload occurs. The housing body comprises a plurality of engagement elements, and the housing cover comprises a plurality of retaining structures corresponding to the engagement elements, wherein the engagement elements are able to be brought into engagement with the retaining structures by rotating the housing cover relative to the housing body.

6 Claims, 3 Drawing Sheets

OVERLOAD CLUTCH

FIELD

The present invention relates to an overload clutch via which drive movements are transmissible in an engaged state wherein the clutch elements are engaged in an interlocking and/or frictional manner and can be brought out of engagement when overload occurs.

BACKGROUND

Overload clutches are known comprising a cylindrical clutch housing having a housing body and a housing cover. The housing body comprises a plurality of resilient detent arms which are arranged on the outer circumference of the housing body. The housing cover comprises a plurality of retaining structures corresponding to the detent arms, which are arranged on an outer circumference of the housing cover. To assemble the clutch housing, the housing cover is axially inserted into the housing body, wherein the detent arms of the housing body are at first radially deflected toward the outside and, in the final position, snap into the retaining structures of the housing cover. Within each clutch housing, two clutch elements are arranged, by means of which a drive movement is transmissible in an engaged state. In the engaged state, the clutch elements are in interlocking and/or frictional engagement with each other to transmit the drive movement. When an overload occurs, the clutch elements are brought out of engagement to mechanically decouple the driven side of the overload clutch from the driving side of the overload clutch. Herein, there is a drawback in that when an overload occurs the housing body has a force applied to it in a direction pointing away from the housing cover. If this force exceeds the retaining force of the detent arms of the housing body, they are deflected and the housing body is released from the housing cover.

The present disclosure provides an overload clutch with superior characteristics with respect to mechanical strength, in particular a relatively mechanically strong connection between a housing body and the housing cover of a clutch housing of the overload clutch.

SUMMARY

An overload clutch according to an example comprises a cylindrical clutch housing having a housing body and a housing cover, and comprising two clutch elements arranged within the clutch housing, via which a driving movement is transmissible in an engaged state, wherein the clutch elements are in interlocking and/or frictional engagement with each other in the engaged state for transmitting the drive movement, and can be brought out of engagement when an overload occurs.

The housing body comprises a plurality of engagement elements which are arranged on an outer circumference of the housing body and face radially inwardly, and the housing cover comprises a plurality of retaining structures corresponding to the engagement elements which are arranged on an outer circumference of the housing cover and face radially outwardly, wherein the engagement elements can be brought into engagement with the retaining structures by rotating the housing cover relative to the housing body.

The overload clutch is provided, in particular, within a drive apparatus, where it has the function of mechanically decoupling a driving side from a driven side when an overload occurs to prevent damage to a drive motor, transmission and/or other components within a drivetrain of the drive apparatus. "Provided" in the present context means specifically programmed, designed and/or equipped. The fact that an object is provided in a particular function means in the present context that the object fulfils and/or performs this particular function at least in one application state and/or operative state. The overload clutch is intended, in particular, for use within a drivetrain of a drive apparatus for the electric adjustment of a closure element of an automotive vehicle. Such closure elements can be, for example, doors, lids, in particular fuel tank caps or loading doors, tailgates or rear doors, engine hoods or glove compartment doors, side-mirror folding mechanisms or the like of an automotive vehicle.

To transmit a drive force, in particular a rotary drive force, from a driving side to a driven side, the overload clutch comprises two clutch elements, wherein a first of the clutch elements is arranged on the driving side and a second one of the clutch elements is arranged on the driven side. The clutch elements are arranged within a clutch housing. In particular, a first one of the clutch elements, in particular, a clutch element arranged on the driving side, is arranged within the clutch housing in a torsion-resistant manner. A second one of the clutch elements, in particular a clutch element arranged on the driven side, is connected to the first clutch element in a torsion-resistant manner in the engaged state, and is arranged to be rotated within the clutch housing relative to the first clutch element in the disengaged state. The driven-side clutch element comprises, in particular, a hub for accommodating a driven shaft, wherein the hub extends, in particular, out of the clutch housing on a driven-side end of the clutch housing. The driven-side clutch element can be designed in a way that splits the functionality of the component, in specific an engagement with a driving-side clutch element and an accommodation for a driven shaft, into two parts. The clutch housing is formed of two parts, in particular, and comprises a housing body and a housing cover. Both the housing body and the housing cover have a circular base. In an assembled state, the clutch housing has a cylindrical outer contour and encloses an at least essentially cylindrical volume. In an assembled state, the clutch housing at least essentially completely encloses the clutch elements.

The housing body is at least essentially configured, in particular, to be cup-shaped. In particular, the housing body can be of a plastic material, and can be an injection molded part, in particular. For applications requiring higher forces the housing body can be of a machined metal material. The housing body, on its driving-side end, in particular, is configured to be open. In particular, on its driven-side end, the housing body comprises a circular recess, in particular, for the extension of a hub of the driven-side clutch element. The housing body comprises a plurality of engagement elements, which are arranged, in particular, on a driving-side end of the housing body. In particular, the engagement elements are integrally formed with the housing body. The engagement elements are distributed, in particular, at least essentially uniformly over the outer circumference of the housing body. "Integrally" means in the present context, in particular, at least adhesively connected, for example by means of a welding process, an adhesive process, an integral molding process and/or any other process that the person skilled in the art deems appropriate, and/or formed in one piece, such as by means of manufacturing as a casting and/or by means of manufacture in one- or multi-component injection molding process and from a single blank. The engagement elements are arranged on an outer circumference of the housing body and extend radially inwardly from the outer circumference of the housing body.

The housing cover comprises a plurality of retaining structures corresponding to the engagement elements, wherein a number of retaining structures corresponds, in particular, to a number of engagement elements of the housing body. The retaining structures are distributed, in particular, at least essentially uniformly over the outer circumference of the housing cover. The retaining structures are arranged on an outer circumference of the housing cover and extend radially outwardly from the outer circumference of the housing cover. In particular, the retaining structures are integrally formed with the housing cover. In an assembled state of the clutch housing, the engagement elements of the housing body engage the retaining structures of the housing cover and/or reach behind at least one structural element of the structural units in the axial direction. In particular, the housing cover can be of a metal and can be formed, in particular, as an injection-molded component. For applications requiring higher forces the housing cover can be of a machined metal material.

For assembly of the clutch housing, the engagement elements of the housing body, are placed, in particular, laterally next to the retaining structures of the housing cover in the circumferential direction of the clutch housing by at least partially axially sliding the housing cover and the housing body into one another. Herein, each of the engagement elements of the housing body is placed between two retaining structures of the housing cover. By rotating the housing cover relative to the housing body, the engagement elements of the housing body can be laterally rotated into the retaining structures of the housing cover and thus into engagement with the retaining structures. In particular, the engagement elements of the housing body, in an assembled state, engage the retaining structures of the housing cover at least in an interlocking manner.

By such a design, a generic overload clutch can be provided with characteristics with respect to a mechanically strong connection between the housing body and the housing cover of the clutch housing, in particular also when an overload occurs. In particular, the use of resilient detent arms can be dispensed by providing the engagement elements of the housing body which can be brought into engagement with the retaining structures of the housing cover by rotating the housing cover relative to the housing body, thus achieving high mechanical strength and reliably and/or securely preventing release of the housing body from the housing cover, in particular, when an overload occurs.

It is further suggested that the retaining structures each have a retaining edge extending in the circumferential direction of the housing cover, wherein each engagement element, in an assembled state, reaches behind the respective retaining edges. In particular, the housing cover can comprise a plurality of material webs on its outer circumference, each of which forming one of the retaining edges, and/or can comprise a material collar interrupted in several places in the circumferential direction, thus forming the retaining edges. Preferably, all retaining edges are disposed at the same level along a circumferential direction of the housing cover. The retaining edges are at least essentially equidistantly spaced, in particular, over the outer circumference of the housing cover. During assembly of the clutch housing, the engagement elements of the housing body are placed next to the retaining structures of the housing cover in the circumferential direction of the clutch housing by means of axially at least partially sliding the housing cover and the housing body into one another in such a manner that a lower edge of the engagement elements is at least on the same level as the retaining edges and/or preferably behind the retaining edges as seen along an insertion direction. The engagement elements of the housing body are disposed in alignment with the retaining edges of the retaining structures by rotating the housing cover relative to the housing body, and completely reach behind the retaining structures in a final position. This can create a simple and mechanically strong interlocking connection between the housing body and the housing cover.

In one example, it is suggested that each retaining structure has two webs, which limit the retaining edges on both sides in the circumferential direction of the housing body. In particular, the webs form a lateral limitation of the contact area between the engagement elements of the housing body and the retaining edges. The webs are arranged, in particular, at opposite ends of the retaining edges and extend from the retaining edges in the axial direction. In particular, the webs extend in the axial direction at least essentially perpendicular to the retaining edges. The wording "essentially perpendicular" in the present context means an orientation of a direction relative to a reference direction, wherein the direction and the reference direction, as viewed, in particular, in one plane, enclose an angle of 90° and the angle has a maximum deviation of less than 5°, in particular, less than 2°, and particularly less than 1°. This helps to reliably prevent releasing a connection between the housing body and the housing cover by, in particular, inadvertent relative rotation with respect to each other, since any rotation is reliably limited by the webs. A distance between the webs preferably corresponds at least essentially to a width of the engagement elements. This results in an at least substantially playless or at least almost playless connection between the housing body and the housing cover. Preferably the first web of each retaining structure has a smaller axial extension than the second web of the respective retaining structure. In particular, the first web with a smaller axial extension is arranged at the end of the retaining edge via which the engagement elements are rotated into the retaining structure. In the present case, the engagement elements are rotated across the first web. The smaller axial extension of the first web enables easy rotation of the engagement elements into the retaining structure.

Furthermore, it is suggested that a distance between the retaining structures at least corresponds to a width of the engagement elements. This enables easy placing of the engagement elements of the housing body between the retaining structures of the housing cover when the housing body and the housing cover are axially slid one into the other.

It is also suggested that the overload clutch comprises, arranged within the clutch housing, at least one spring element, which axially biases the clutch elements against each other. In particular, the spring element is arranged between the housing cover and the clutch element arranged on the side of the housing cover. Alternatively, the spring element can also be arranged between the housing body and the clutch element on the side of the housing body. During normal operation the clutch elements are pressed against each other by a spring force of the spring element. In the case of an overload the clutch elements are brought out of engagement with each other against the spring force of the spring element. This results in an improved function of the overload clutch and/or a defined overload torque.

In addition, it is suggested that the clutch elements each have claw configurations which engage each other in the engaged state and are formed in such a way that they slide against each other in the case of an overload. The two clutch elements interact, in particular, in the manner of a claw clutch coupling. The claw configurations are formed such that the clutch elements slide against each other in the case of an overload so that they are displaced with respect to each other along their common axis of rotation and come out of driving engagement with each other. The flanks of the respective claw configurations are suitably chamfered. In order to reduce an influence by material tolerances of the clutch elements a small amount of grease may be applied onto the engaging surfaces of the clutch elements. By providing a design in the manner of a claw clutch coupling, a rugged structure can be realized.

Furthermore, a drive apparatus with a drive motor and an overload clutch are provided. In particular, the drive apparatus can be provided for the electric adjustment of a closure element of an automotive vehicle. Such closure elements can be, for example, doors, lids, in particular fuel tank caps or loading doors, tailgates or rear doors, engine hoods, glove compartment doors, even side-mirror folding mechanisms or the like of an automotive vehicle. The drive motor is configured, in particular, as a brushed or brushless DC motor and/or as a stepper motor. The overload clutch is arranged in the drivetrain downstream from the drive motor. The drive apparatus comprises, in particular, a transmission arranged between the drive motor and the overload clutch. The overload clutch is arranged, in particular on the driven side and is intended to accommodate a driven shaft. The overload clutch is provided within the drive apparatus for mechanically decoupling a driving side from a driven side when an overload occurs to prevent damage to the drive motor, the transmission and/or other components within a drivetrain of the drive apparatus and/or the driven element.

Furthermore, a method is suggested for assembly of an overload clutch comprising a cylindrical clutch housing having a housing body and a housing cover, and comprising two clutch elements arranged within the clutch housing, via which the drive movement is transmissible in the engaged state, wherein the clutch elements are in interlocking and/or frictional engagement with each other to transmit the driving movement in the engaged state, and can be brought out of engagement when an overload occurs, wherein the housing body and the housing cover of the clutch housing can be brought into interlocking engagement with each other by an opposed rotation about an axis of rotation. Preferably, the housing cover is at least partially axially slid into the housing body and then rotated relative to the housing body. In particular, the engagement elements of the housing body are placed laterally next to the retaining structures of the housing cover as seen in the circumferential direction of the clutch housing by axially at least partially sliding the housing cover and the housing body into one another. To do this, each engagement element of the housing body is placed between two retaining structures of the housing cover. The engagement elements of the housing body are laterally rotated into the retaining structures of the housing cover and thus brought into engagement with the retaining structures by rotating the housing cover relative to the housing body. This achieves a mechanically strong connection between the housing body and the housing cover of the clutch housing, in particular also when an overload occurs. In particular, the engagement elements of the housing body which are brought into engagement with the retaining structures of the housing cover by rotating the housing cover relative to the housing body can achieve high mechanical strength and, in particular, reliably and/or securely prevent releasing of the housing body from the housing cover when an overload occurs.

The overload clutch is not limited to the above-described application and example. In particular, to achieve any of the described ways of functioning, the overload clutch can comprise a number of individual components, parts and units different from the above-mentioned number.

BRIEF DESCRIPTION OF DRAWINGS

Further effects can be derived from the following description of the drawing. In the drawing, an exemplary example is shown. The drawing, the description and the claims include numerous features in combination. The person skilled in the art will also suitably consider the features in isolation and combine them in other suitable combinations.

DESCRIPTION OF THE PREFERRED EMBODIMENTS

Figure 1:
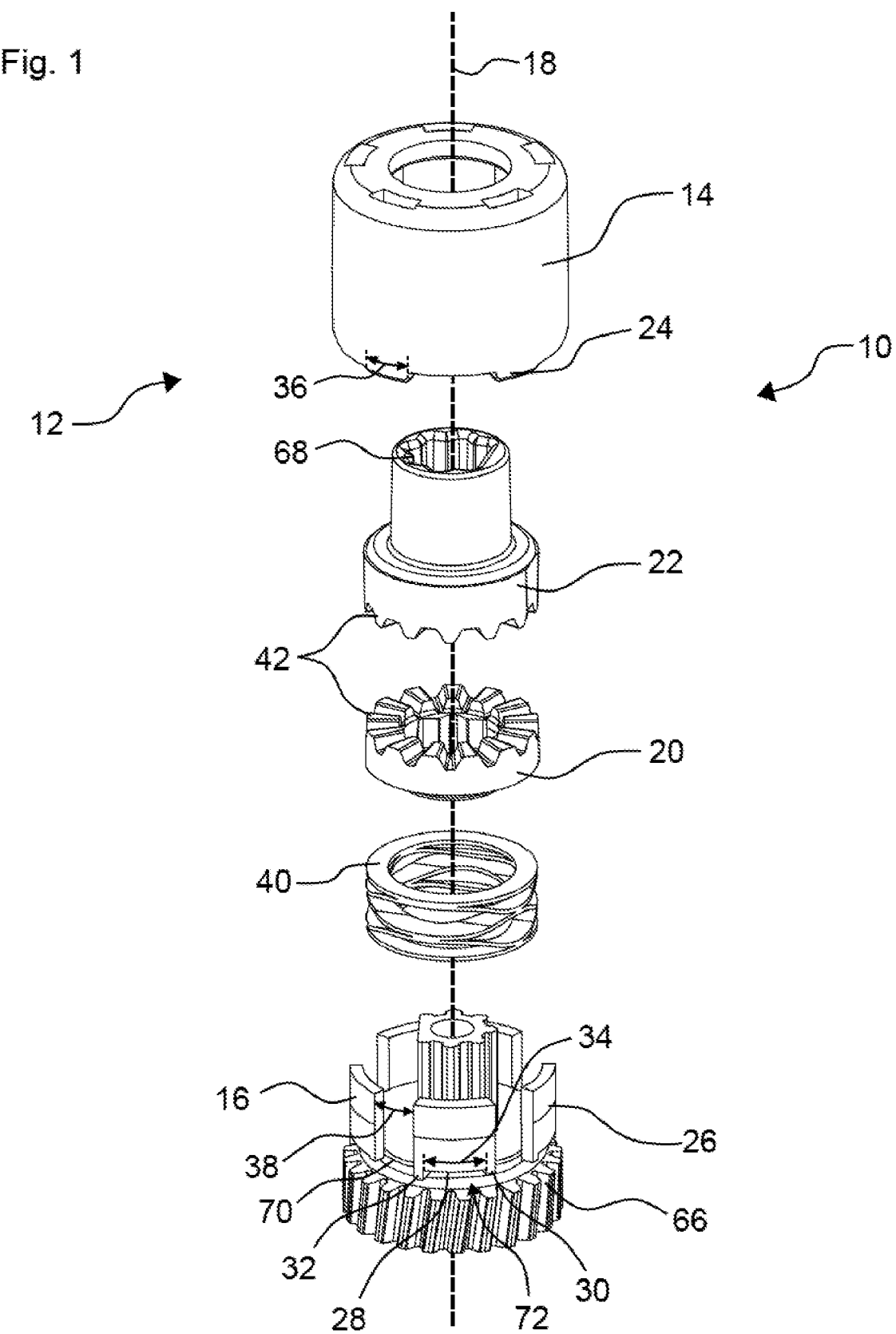
FIG. 1 shows an exploded view of an overload clutch comprising a cylindrical clutch housing according to an example.
Figure 2:
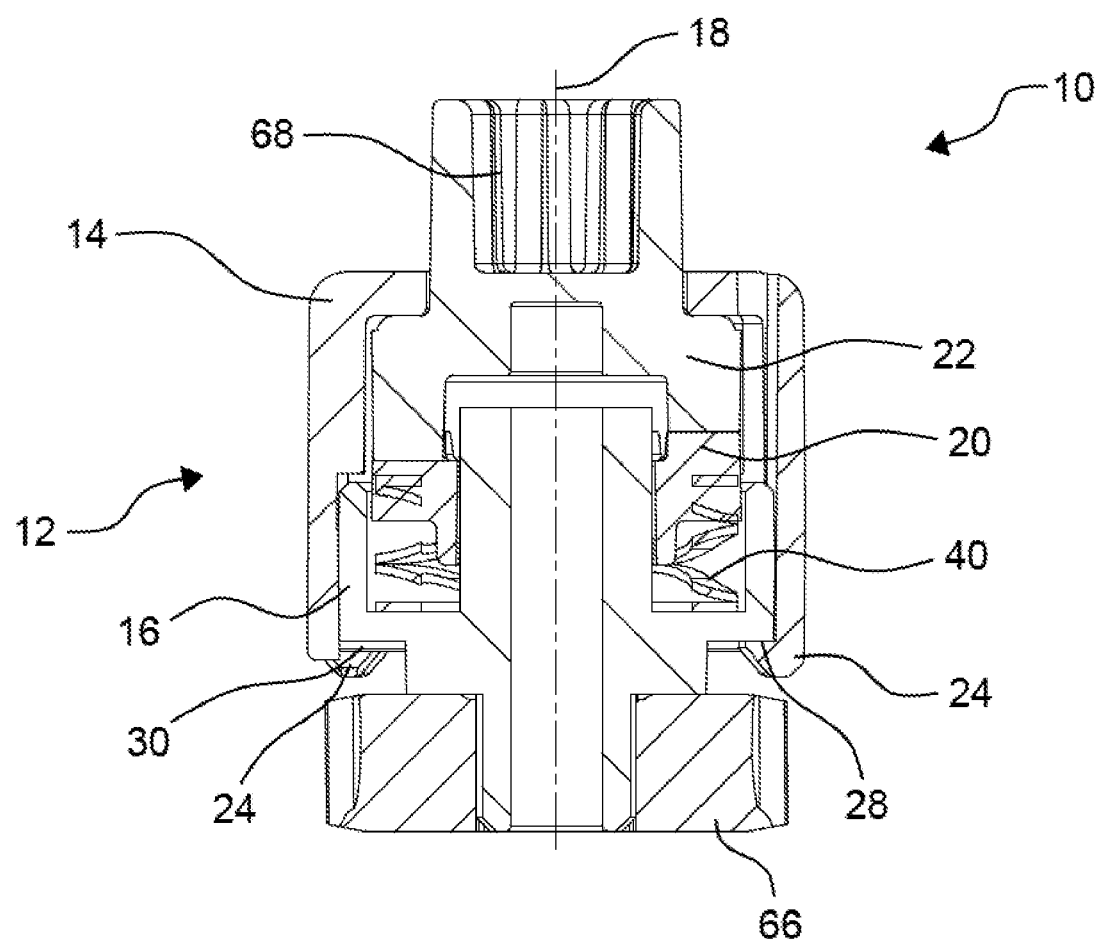
FIG. 2 shows a sectional view of the overload clutch according to FIG. 1 in an assembled state.

FIG. 1 shows an exploded view of a preferred configuration for an overload clutch 10 comprising a cylindrical clutch housing 12. FIG. 2 shows a sectional view of the overload clutch 10 in an assembled state. The clutch housing 12 comprises a housing body 14 and a housing cover 16. Within the clutch housing 10, two clutch elements 20, 22 are arranged, via which a drive movement is transmissible in the engaged state. To transmit the drive movement, the clutch elements 20, 22 are in interlocking and/or frictional engagement with each other in the engaged state. A driving-side clutch element 20 is arranged within the clutch housing 12 in a torsion-resistant manner. A driven-side clutch element 22 is connected with the driving-side clutch element 20 in a torsion-resistant manner in an engaged state. The driven-side clutch element 22 comprises a hub 68 for accommodating a driven shaft. When an overload occurs, the clutch elements 20, 22 can be brought out of engagement. The clutch elements 20, 22 each comprise claw configurations 42 which engage each other in an engaged state and are formed in such a way that they slide with respect to each other in the case of an overload. The claw configurations 42 are formed such that the clutch elements 20, 22 slide on each other in the case of an overload which displaces them along their common axis of rotation 18 and they come out of frictional engagement with each other. The flanks of the respective claw configurations 42 are correspondingly chamfered. The overload clutch 10 also comprises at least one spring element 40 arranged within the clutch housing 12, which axially biases the clutch elements 20, 22 against each other. The spring element 40 is formed as a multi-layer wave spring. The spring element 40 is arranged between the housing cover 16 and the driving-side clutch element 20. During normal operation, the clutch elements 20, 22 are pressed against each other by a spring force of the spring element 40. In the case of an overload, the clutch elements 20, 22 are brought out of engagement against the spring force of the spring element 40.

The housing body 14 comprises a plurality of engagement elements 24, which are arranged on an outer circumference of the housing body 14 and face radially inwardly. The engagement elements 24 extend radially inwardly from the outer circumference of the housing body 14. The engagement elements 24 are preferably uniformly distributed over the outer circumference of the housing body 14. The housing cover 16 comprises a plurality of retaining structures 26 corresponding to the engagement elements 24 of the housing body 14, which are arranged on an outer circumference of the housing cover 16 and face radially outwardly. A number of retaining structures 26 corresponds to a number of engagement elements 24 of the housing body 14. The retaining structures 26 are preferably uniformly distributed over the outer circumference of the housing cover 16. Preferably, a center distance of the retaining structures 26 at least essentially corresponds to a center distance of the engagement elements 24. Preferably, a distance 38 between the retaining structures 26 at least corresponds to a width 36 of the engagement elements 24.

The retaining structures 26 each preferably comprise a retaining edge 28 extending in the circumferential direction of the housing cover 16. The housing cover 16 comprises a material collar 70 interrupted in several places in the circumferential direction, thus forming the retaining edges 28. The retaining edges 28 are equidistantly spaced over the outer circumference of the housing cover 16. In an assembled state of the clutch housing 12, each of the engagement elements 24 reaches behind one of the retaining edges 28. Furthermore, the retaining structures 26 each have two webs 30, 32, which limit the retaining edges 28 on both sides in the circumferential direction of the housing body 14. The webs 30, 32 form a lateral limitation of a contact area 72 between the engagement elements 24 of the housing body 14 and the retaining edges 28 of the housing cover 16. The webs 30, 32 are arranged at opposite ends of the retaining edges 28 and extend from the retaining edges 28 in the axial direction. Each first web 30 of a retaining structure 26 has a smaller axial extension than the second web 32 of the respective retaining structure 26. A distance 34 between the webs 30, 32 of a retaining structure 26 at least essentially corresponds to a width 36 of the engagement elements 24.

The engagement elements 24 can be brought into engagement with the retaining structures 26 during assembly of the clutch housing 12 by rotating the housing cover 16 relative to the housing body 14. To assemble the overload clutch 10, the housing body 14 and the housing cover 16 of the clutch housing 12 are brought into interlocking engagement with each other by means of an opposed rotary motion about a rotary axis 18. To achieve this, the housing cover 16 is at first at least partially axially slid into the housing body 14. The engagement elements 24 of the housing body 14 are laterally placed next to the retaining structures 24 of the housing cover 16 as seen in the circumferential direction of the clutch housing 12 by axially sliding the housing cover 16 and the housing body 14 into one another. Herein, each engagement element 24 of the housing body 14 is placed between two retaining structures 26 of the housing cover 16. Then the housing cover 16 is rotated relative to the housing body 14. The rotation of the housing cover 16 relative to the housing body 14 rotates the engagement elements 24 of the housing body 14 laterally into the retaining structures 26 of the housing cover 16 and thus into engagement with the retaining structures 26. The rotation of the engagement elements 24 into the retaining structures 26 is achieved across the first web 32 of the retaining structures 26 which has the smaller axial extension. In a fully rotated state, the engagement elements 24 reach behind the retaining edges 28 of the retaining structures 26 in the axial direction. The spring force of the spring element 40 presses the engagement elements 24 against the retaining edges 28.

Figure 3:
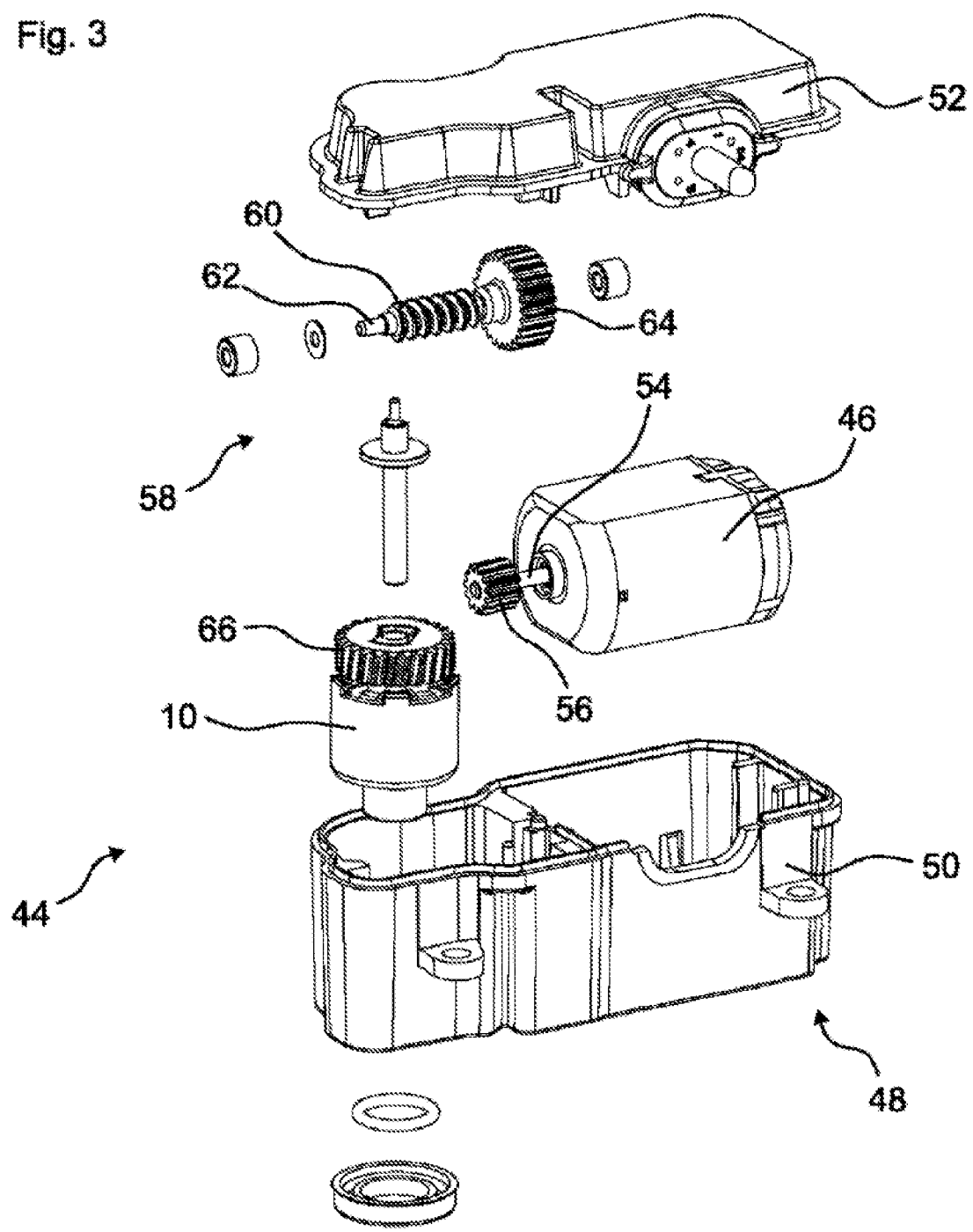
FIG. 3 shows an exploded view of a drive apparatus comprising a drive motor and the overload clutch according to FIGS. 1 and 2.

FIG. 3 shows an exploded view of a preferred drive apparatus 44. The drive apparatus 44 comprises a drive motor 46 and an overload clutch. The drive motor 46 is preferably a DC motor. The drive apparatus 44 further comprises a housing 48 which comprises a housing trough 50 and a housing cover 52. In an assembled state, both the drive motor 44 and the overload clutch 10 are arranged within the housing 48. The overload clutch 10 is rotatably supported within the housing. A rotary axis 18 of the overload clutch 10 extends orthogonally to a rotary axis of a shaft 54 of the drive motor 46. A gear 56 is arranged on the shaft 54 of the drive motor 46, which is connected to the shaft 54 in a torsion-resistant manner. Furthermore, the drive apparatus 44 comprises a worm gearbox 58 arranged between the drive motor 46 and the overload clutch 10. The worm gearbox 58 comprises a worm 60 fixed on a shaft 62 in a torsion-resistant manner, wherein a gear 64 is arranged on the end of the shaft 62 that faces the drive motor 46. The gear 64 of the worm gearbox 58 meshes with the gear 56 of the drive motor 46. A worm wheel 66 of the worm gearbox 58 is connected to the overload clutch 10 in a torsion-resistant manner so that a rotary motion of the shaft 54 of the drive motor 46 is transmitted to the overload clutch 10 via the worm gearbox 58.

LIST OF REFERENCE NUMERALS 10 overload clutch
12 clutch housing
14 housing body
16 housing cover
18 rotary axis
20 clutch element
22 clutch element
24 engagement element
26 retaining structure
28 retaining edge
30 web
32 web
34 distance
36 width
38 distance
40 spring element
42 claw configuration
44 drive apparatus
46 drive motor
48 housing
50 housing trough
52 housing cover
54 shaft
56 gear
58 worm gearbox
60 worm
62 shaft
64 gear
66 worm wheel
68 hub
70 material collar
72 contact area

What is claimed is:
1. An overload clutch, comprising:
a cylindrical clutch housing having a housing body and a housing cover, and comprising two clutch elements arranged within the clutch housing, via which a drive movement is transmissible in an engaged state, wherein the clutch elements, for transmitting the drive movement in the engaged state, are engaged with each other in an interlocking and/or frictional manner and, can be brought out of engagement when an overload occurs, wherein the housing body comprises a plurality of engagement elements, which are arranged on an outer circumference of the housing body and face radially inwardly, and the housing cover comprises a plurality of retaining structures corresponding to the engagement elements, which are arranged on an outer circumference of the housing cover and face radially outwardly, wherein the engagement elements are able to be brought into engagement with the retaining structures by rotating the housing cover relative to the housing body, wherein the retaining structures each have a retaining edge extending in the circumferential direction of the housing cover, wherein, in an assembled state, each engagement element reaches behind a respective one of the retaining edges, wherein the retaining structures each have two webs, which limit the retaining edges on both sides in the circumferential direction of the housing body, and wherein a first web of each of the retaining structures has a smaller axial extension than a second web of the respective retaining structure.

2. The overload clutch according to claim 1, wherein a distance between the webs at least essentially corresponds to a width of an engagement element.

3. The overload clutch according to claim 1, wherein a distance between the retaining structures corresponds at least to a width of an engagement element.

4. The overload clutch according to claim 1, further comprising at least one spring element, arranged within the clutch housing, which axially biases the clutch elements against each other.

5. The overload clutch according to claim 1, wherein each of the clutch elements has claw configurations which engage each other in the engaged state and are formed in such a manner that they slide on one another in the case of an overload.

6. The overload clutch according to claim 1 wherein said overload clutch is positioned in a drive apparatus having a drive motor.

* * * * *